(12) United States Patent
Lee et al.

(10) Patent No.: US 8,107,413 B2
(45) Date of Patent: Jan. 31, 2012

(54) METHOD FOR ALLOCATING MULTIPLE RADIO COMMUNICATION PERIODS

(75) Inventors: Jin Lee, Gyeonggi-do (KR); Yong Ho Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 404 days.

(21) Appl. No.: 12/553,720

(22) Filed: Sep. 3, 2009

(65) Prior Publication Data

US 2010/0135256 A1 Jun. 3, 2010

Related U.S. Application Data

(60) Provisional application No. 61/094,391, filed on Sep. 4, 2008.

(30) Foreign Application Priority Data

Sep. 24, 2008 (KR) .................. 10-2008-0093575

(51) Int. Cl.
  *H04J 3/08* (2006.01)
  *H04J 3/00* (2006.01)
  *H04L 12/413* (2006.01)
(52) U.S. Cl. ......... 370/326; 370/336; 370/345; 370/445
(58) Field of Classification Search .......... 370/229–230, 370/252, 310–350, 445–462; 375/130, 295–299, 375/346–348; 455/3.01, 422.1, 426.1, 432.1–448
See application file for complete search history.

(56) References Cited

U.S. PATENT DOCUMENTS

| | | | | |
|---|---|---|---|---|
| 7,936,709 B2 * | 5/2011 | Bhatti et al. | ................... | 370/326 |
| 8,059,622 B2 * | 11/2011 | Zhu | ................................ | 370/338 |
| 2006/0056448 A1 | 3/2006 | Zaki et al. | | |
| 2008/0037431 A1 * | 2/2008 | Werb et al. | ..................... | 370/241 |
| 2008/0298290 A1 * | 12/2008 | Wentink | ......................... | 370/311 |
| 2009/0213819 A1 | 8/2009 | Kalhan | | |

FOREIGN PATENT DOCUMENTS

| | | | |
|---|---|---|---|
| GB | 2443862 A | * | 5/2008 |
| KR | 10-2008-0054987 | | 6/2008 |
| KR | 10-2008-0078194 | | 8/2008 |
| KR | 10-2009-0087737 | | 8/2009 |
| KR | 10-0928679 | | 11/2009 |
| WO | WO 2010027208 A2 | * | 3/2010 |

* cited by examiner

*Primary Examiner* — Tri H Phan
(74) *Attorney, Agent, or Firm* — Lee, Hong, Degerman, Kang & Waimey

(57) ABSTRACT

A method for allocating multiple radio communication periods to an MS supporting co-existence mode is disclosed. The method includes transmitting a co-existence mode request message to a BS by the MS, receiving information about the position of a start frame for the co-existence mode by a co-existence mode response message as a response to the co-existence mode request message from the BS by the MS, and receiving information about an allocated Wi-Fi beacon reception period by an unsolicited co-existence mode response message in the start frame from the BS by the MS. A frame allocation pattern for allocating periods for communications with a Bluetooth or Wi-Fi system using a frequency band adjacent to that of an IEEE 802.16m system can be provided according to an IEEE 802.16m frame structure, and an MS with multiple radio interfaces can communicate with each system reliably, while minimizing interference between systems.

11 Claims, 11 Drawing Sheets

METHOD FOR ALLOCATING MULTIPLE RADIO COMMUNICATION PERIODS This application claims the benefit of Korean Patent Application No. 10-2008-0093575, filed on Sep. 24, 2008, which is hereby incorporated by reference as if fully set forth herein.

This application also claims the benefit of U.S. Provisional Application Ser. No. 61/094,391, filed on Sep. 4, 2008 which is hereby incorporated by reference as if fully set forth herein.

BACKGROUND OF THE INVENTION

1. Field of the Invention

The present invention relates to multiple radio interfaces, and more particularly, to a method for reducing interference during communications between a Mobile Station (MS) having both a Wireless Fidelity (Wi-Fi) interface and an Institute of Electrical and Electronics Engineers (IEEE) 802.16m interface and each system, when the MS communicates with a plurality of systems in a network where a Wi-Fi wireless network system is co-located with an IEEE 802.16m system called an International Mobile Telecommunications-Advanced (IMT-Advanced) system.

2. Discussion of the Related Art

Wireless Local Area Network (WLAN) is a network environment in which a LAN service is provided to a wireless terminal equipped with a WLAN card, such as a Personal Digital Assistant (PDA) or a laptop computer, through an Access Point (AP) corresponding to a wired LAN hub. Briefly, WLAN may be regarded as a system that substitutes a radio link between an AP and a Network Interface Card (NIC) like a WLAN card for a wired link between a hub and a user terminal in a legacy Ethernet system. Owing to no need for wiring to a wireless terminal, WLAN advantageously facilitates relocation of the wireless terminal and network configuration and extension, and enables communications of the wireless terminal during movement. Despite these benefits, WLAN offers a relatively low data rate, experiences unstable signal quality inherent to the nature of radio channels, and causes signal interference.

FIG. 1 illustrates an exemplary WLAN configuration.

Referring to FIG. 1, two types of network configurations are defined for WLAN depending on inclusion of APs. A WLAN configuration including APs is called an infrastructure network, whereas a WLAN configuration without APs is called an ad-hoc network. The service area of an AP is defined as a Basic Service Area (BSA), and an AP and wireless terminals connected to the AP form a Basic Service Set (BSS). A service provided to a wireless terminal through the connection to the AP is referred to as a Station Service (SS). The SS also covers a service between wireless terminals in the ad-hoc network. As illustrated in FIG. 1, service areas (BSAs) may overlap with each other. Two or more APs may enable communications between wireless terminals connected to the APs through interworking between the APs. In this case, the interconnections of the APs form a Distribution System (DS). A service provided through the DS is called a Distribution System Service (DSS) and an area to which the DSS is available is called an Extended Service Area (ESA). All wireless terminals that receive the DSS and APs within the ESA are collectively called an Extended Service Set (ESS).

FIG. 2A illustrates a Medium Access Control (MAC) architecture in IEEE 802.11.

Referring to FIG. 2A, the IEEE 802.11 MAC layer is based on a contention-based Distributed Coordination Function (DCF), added with a non-contention-based Point Coordination Function (PCF).

The DCF is a basic medium access mechanism of the IEEE 802.11 MAC layer, which adopts Carrier Sense Multiple Access with Collision Avoidance (CSMA/CA). The DCF is implemented in all STAtions (STAs), for application to an Independent BSS (IBSS) or an infrastructure network. Before signal transmission, an STA senses a channel to determine whether another STA is transmitting a signal on the channel, and continues to sense the channel, while subtracting a channel idle time from a random backoff time. If the channel is idle until the backoff time reaches zero, the STA initiates a transmission. Otherwise, the STA attempts a transmission using the remaining backoff time in a Contention Period (CP) after the current transmission ends. Meanwhile, if the STA succeeds in acquiring the channel in the backoff procedure, it solves a hidden terminal problem by exchanging short control frames, i.e. a Request To Send (RTS) frame and a Clear To Send (CTS) frame.

The PCF is an optional medium access mechanism of the IEEE 802.11 MAC layer, applicable to an infrastructure network only. The PCF uses a polling scheme in which a Point Coordinator (PC) of an AP in a BSS polls STAs for transmissions. The PCF is implemented by access priority mechanism-based virtual carrier sensing. That is, the PCF uses a beacon management frame to set a Network Allocation Vector (NAV) and control medium access for an MS. Both the DCF and the PCF may be used for the same BSS. When a PC operates in a BSS, the DCF and the PCF alternate with each other, such that a CP alternates with a Contention-Free Period (CFP).

FIG. 2B illustrates an exemplary format of a management frame.

Referring to FIG. 2B, a Beacon frame, a Probe Request/Response frame, an Authentication Request/Response frame, an Association Request/Response frame, or the like is included in a frame body of a management frame. These frames are used for a wireless terminal to access an AP.

A Wi-Fi beacon message is periodically broadcast from a Wi-Fi AP. An STA may measure the channel status between it and the AP from the beacon message and estimate a Target Beacon Transmission Time (TBTT) using beacon interval information included in the beacon message. Generally, the STA measures the channel status by receiving a plurality of beacon messages. Besides, the beacon message includes information about capabilities supported by the AP (e.g. infrastructure mode/ad-hoc network mode, information indicating whether the PCF is supported, information indicating whether data encryption is supported, a Service Set Identifier (SSID), etc.). Hence, the beacon message is the first message that the STA receives to initiate communications with the AP.

To avoid contention for data transmission, the STA senses a channel and if the medium is sensed as idle, it takes a data transmission opportunity. When the STA receives an ACKnowledgment (ACK) for the transmitted data, this confirms successful data transmission. If the STA fails to receive the ACK message, it retransmits the data a backoff time later. The STA may perform a process for sensing that another STA is occupying the channel by transmitting a simple RTS/CTS control message before the data transmission.

FIG. 3 illustrates a frame structure under consideration for an IEEE 802.16m system.

Referring to FIG. 3, each 20-ms superframe is divided into four 5-ms frames, each frame including eight subframes. The subframes are allocated for DownLink (DL) and UpLink (UL) transmission. In the illustrated case of FIG. 3, DL and UL subframes are allocated at a ratio of 5:3 in a frame. One subframe may include six symbols, each symbol being 617 μs in duration. A SuperFrame Header (SFH) is transmitted every 20 ms, carrying cell-specific system information on a Secondary Broadcast CHannel (SBCH) and common system information on a Primary Broadcast CHannel (PBCH). Compared to an IEEE 802.16e broadband wireless access system, the IEEE 802.16m system may transmit a MAP (A-MAP) at a variable position. Since both the downlink and the uplink can be described with a MAP in a frame, a data transmission delay may be reduced.

FIG. 4 illustrates the frequency spectrum of a co-located co-existence environment.

Referring to FIG. 4, because the IEEE 802.16m system uses a frequency band adjacent to the Industrial, Scientific, and Medical (ISM) band of Bluetooth (BT) and Wi-Fi systems, severe interference occurs if a plurality of radio technologies are used independently or simultaneously in an STA. For example, the IEEE 802.16m system and the Wi-Fi system operate independently. Hence, when an MS receives data from the IEEE 802.16m system, it may occur that transmission of a Wi-Fi data packet is blocked.

In this context, to minimize interference between systems, a legacy Worldwide Interoperability for Microwave Access (WiMAX) system allows an MS to attempt to communicate with a Wi-Fi network during a sleep interval and to resume communications with a WiMAX network during a listening interval, using a power saving class (PSC) that the MS initiates to prevent power consumption.

Conventionally, the MS may communicate in Wi-Fi intermittently using the power saving class of the broadband wireless access system. However, co-existence mode period allocation based on the power saving class is classified according to the characteristics of IEEE 802.16 data traffic. For Wi-Fi traffic transmission in co-existence mode, it is efficient to allocate a co-existence mode period suitable for the characteristics of Wi-Fi transmission traffic. Accordingly, there exists a need for efficiently allocating frames, taking into account the transmission duration or transmission time of Wi-Fi data, etc. when an IEEE 802.16m BS allocates a Wi-Fi data transmission period to a multi-radio MS with two interfaces (i.e. an IEEE 802.16m interface and a Wi-Fi interface) in an IEEE 802.16m system using a subframe structure.

SUMMARY OF THE INVENTION

Accordingly, the present invention is directed to a method for allocating multiple radio communication periods that substantially obviates one or more problems due to limitations and disadvantages of the related art.

An object of the present invention is to provide a method for efficiently receiving a service from each system, while reducing interference during communications between an MS having multiple radio interfaces and each system, when the MS communicates with a plurality of wireless systems.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings.

To achieve these objects and other advantages and in accordance with the purpose of the invention, as embodied and broadly described herein, a method for allocating multiple radio communication periods to an MS supporting co-existence mode includes transmitting a co-existence mode request message to a BS by the MS, receiving information about the position of a start frame for the co-existence mode by a co-existence mode response message as a response to the co-existence mode request message from the BS by the MS, and receiving information about an allocated Wi-Fi beacon reception period by an unsolicited co-existence mode response message in the start frame from the BS by the MS.

The co-existence mode request message may include a TBTT for the MS. In this case, the information about an allocated Wi-Fi beacon reception period may be information calculated using the TBTT by the BS.

The information about an allocated Wi-Fi beacon reception period may include a bitmap indicating positions of subframes in which the MS will receive a Wi-FI beacon.

In another aspect of the present invention, a method for allocating multiple radio communication periods to an MS supporting co-existence mode includes transmitting a co-existence mode request message to a BS by the MS, receiving information about the position of a start frame for the co-existence mode by a co-existence mode response message as a response to the co-existence mode request message from the BS by the MS, requesting allocation of a Wi-Fi beacon reception period to the BS by co-existence polling by the MS, and receiving information about an allocated Wi-Fi beacon reception period by an unsolicited co-existence mode response message as a response to the co-existence polling from the BS by the MS.

The co-existence mode request message may include a TBTT for the MS.

In a further aspect of the present invention, a method for allocating multiple radio communication periods to an MS supporting co-existence mode includes transmitting a co-existence mode request message to a BS by the MS, receiving information about the position of a start frame for the co-existence mode by a co-existence mode response message as a response to the co-existence mode request message from the BS by the MS, requesting allocation of a Wi-Fi data period to the BS by co-existence polling by the MS, and receiving information about an allocated Wi-Fi data period by an unsolicited co-existence mode response message as a response for the co-existence polling from the BS by the MS.

During requesting of allocation of a Wi-Fi data period, the MS may request change of an allocated Wi-Fi data period.

The method may further include transmitting a co-existence mode termination message to the BS by the MS, if the MS completes data transmission and reception in the allocated Wi-Fi data period.

The information about an allocated Wi-Fi data period may include a bitmap indicating positions of subframes in which the MS will receive Wi-Fi data.

The allocated Wi-Fi data period may include a time period in which the MS will receive an ACKnowledgment (ACK) message for data transmitted by the MS.

According to the embodiments of the present invention, a frame allocation pattern according to an IEEE 802.16m frame structure for allocating periods for communications with a Bluetooth or Wi-Fi system using a frequency band adjacent to that of an IEEE 802.16m system is provided. As a result, an MS with multiple radio interfaces can communicate with each system reliably, while minimizing interference between systems.

It will be appreciated by persons skilled in the art that the present invention is not limited to what has been particularly described hereinabove. Other effects that are not described herein will be apparent from the following description to persons skilled in the art.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Now, preferred embodiments of the present invention will be described in detail with reference to the accompanying drawings. Those skilled in the art will appreciate that various modifications and variations can be made in the embodiments of the present invention described FIG. 5 illustrates the structure of a multi-radio entity, for ensuring co-existence.

Figure 1:
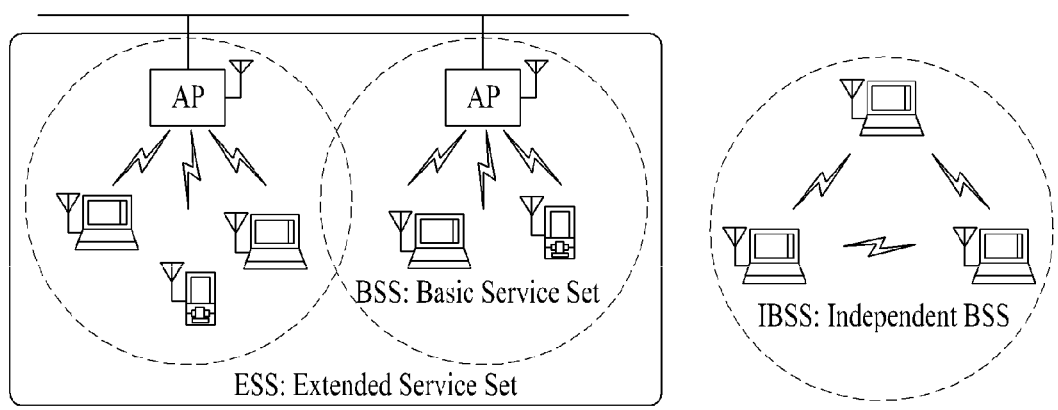
FIG. 1 illustrates an exemplary Wireless Local Area Network (WLAN) configuration.
Figure 2A:
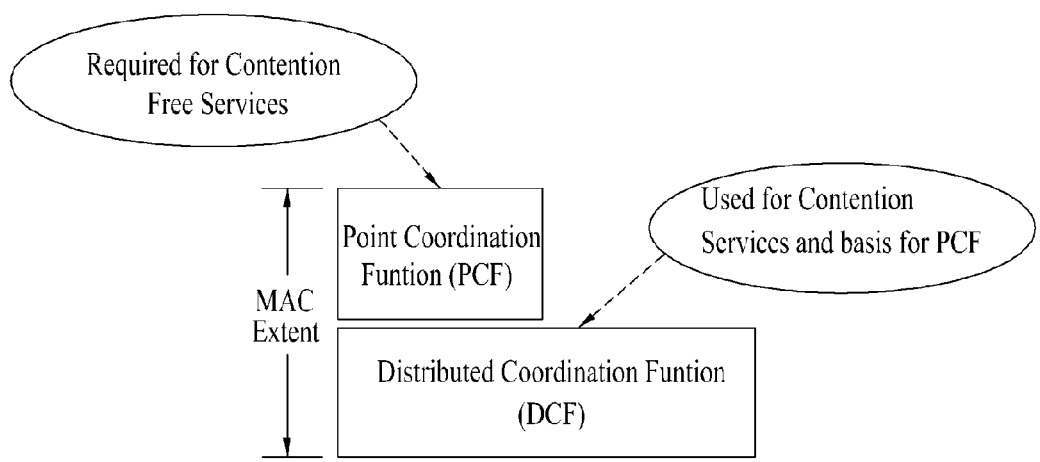
FIG. 2A illustrates a Medium Access Control (MAC) architecture in IEEE 802.11.
Figure 2B:
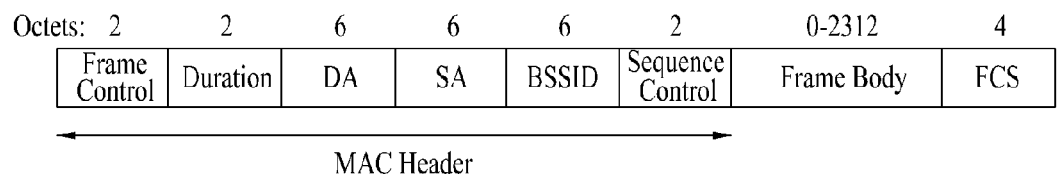
FIG. 2B illustrates an exemplary format of a management frame.
Figure 3:
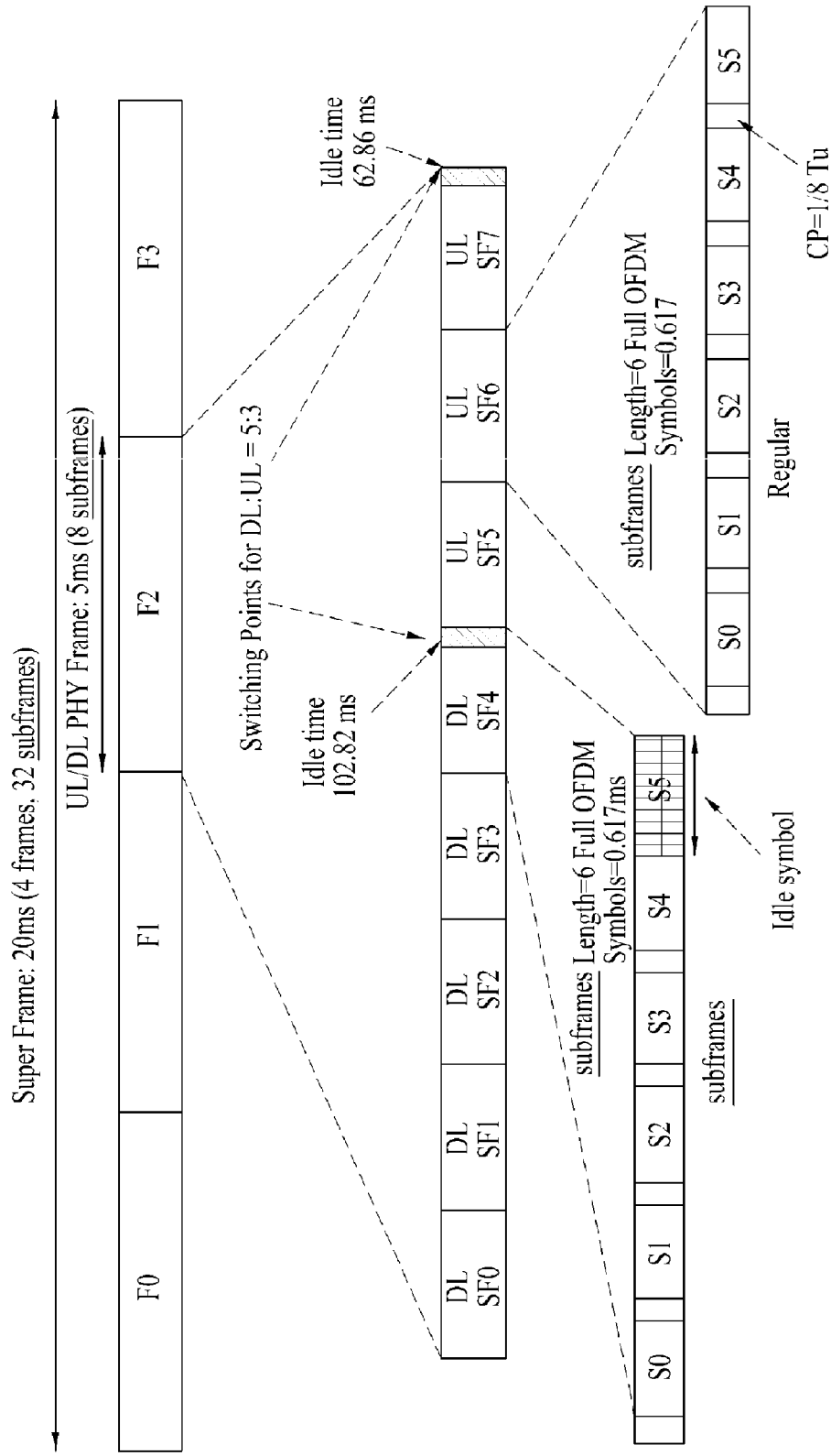
FIG. 3 illustrates a frame structure under consideration for an IEEE 802.16m system.
Figure 4:
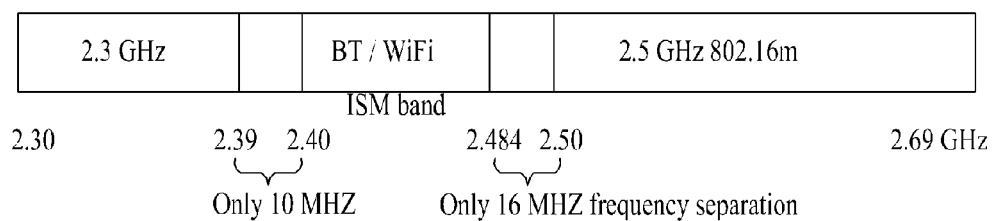
FIG. 4 illustrates the frequency spectrum of a co-located co-existence environment.
Figure 5:
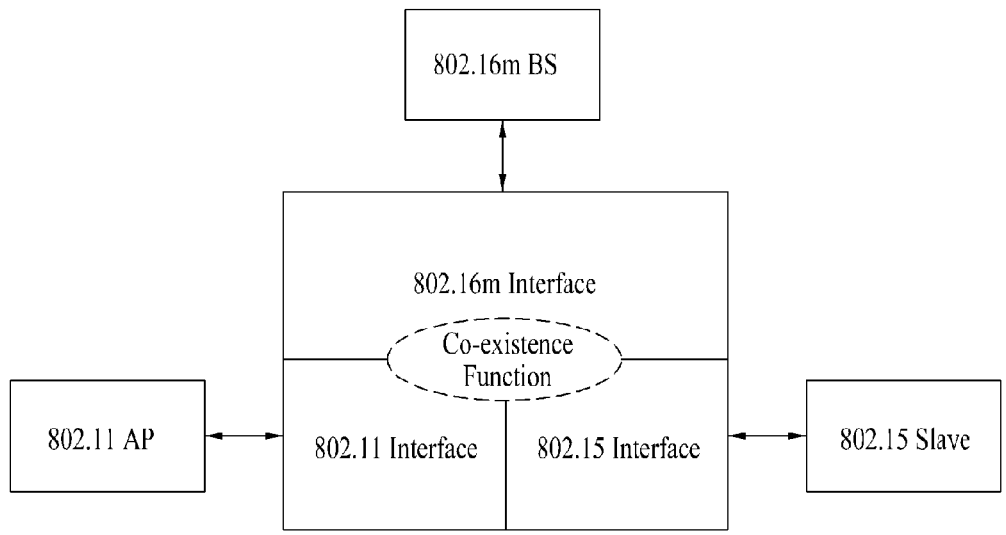
FIG. 5 illustrates the structure of a multi-radio entity, for ensuring co-existence.

Referring to FIG. 5, a Mobile Station (MS) has an Institute of Electrical and Electronics Engineers (IEEE) 802.16 interface, an IEEE 802.11 interface, and an IEEE 802.15 interface, for example. The MS may additionally have any other interface. The radio interfaces may communicate with predetermined Base Stations (BSs) independently and a Co-existence Function is provided in the MS, for connecting the radio interfaces for communications. The Co-existence Function may control and manage co-existence-mode operations. For instance, the IEEE 802.11 interface may transmit to the Co-existence Function information required for an IEEE 802.16m MS to request a co-existence mode period to an IEEE 802.16m BS. Further, the Co-existence Function may transmit data during a co-existence mode period that the IEEE 802.11 interface requests to the Co-existence Function to succeed in data transmission without collision. That is, the Co-existence Function may also coordinate collision-free data transmission from the IEEE 802.11 interface or the IEEE 802.15 interface, when co-existence mode is allowed for the IEEE 802.16m MS.

Figure 6:
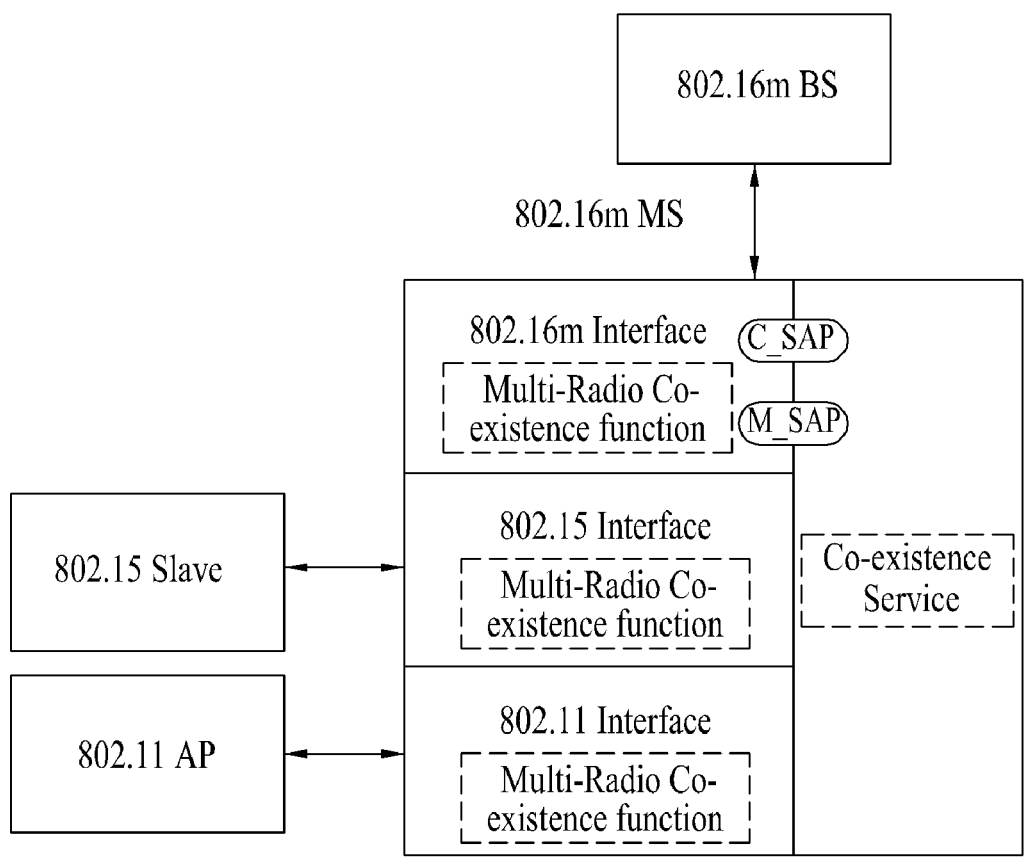
FIG. 6 illustrates the structure of a multi-radio entity to which an exemplary embodiment of the present invention is applied.

FIG. 6 illustrates the structure of a multi-radio entity to which an exemplary embodiment of the present invention is applied.

Referring to FIG. 6, an MS has an IEEE 802.16 interface, an IEEE 802.11 interface, and an IEEE 802.15 interface, for example. The MS may additionally have any interface other than the interfaces illustrated in FIG. 6. The radio interfaces may communicate with predetermined BSs independently and a Multi-Radio Co-existence Function is added to each radio interface, for connecting the radio interfaces for communications. These Multi-Radio Co-existence Functions may control and manage co-existence-mode operations in the MS by communicating with an upper management entity called a Co-existence Service. For example, the IEEE 802.11 interface may transmit to the Co-existence Service through the IEEE 802.11 Multi-Radio Co-existence Function information required for an IEEE 802.16m MS to request a co-existence mode period to an IEEE 802.16m BS. The Co-existence Service exists in a Network Control and Management Service (NCMS) defined in IEEE 802.16 and takes charge of the co-existence of the radio interfaces. The Co-existence Service transmits co-existence information related to other radio interfaces to the IEEE 802.16m Multi-Radio Co-existence Function in order to perform an operation that an IEEE 802.16m wireless network needs, that is, to request co-existence mode period allocation and the IEEE 802.16m Multi-Radio Co-existence Function transmits the request to the BS.

The IEEE 802.16m Multi-Radio Co-existence Function may coordinate collision-free data transmission from the IEEE 802.11 interface or the IEEE 802.15 interface by communicating with the IEEE 802.11 or 802.15 Multi-Radio Co-existence Function, when the co-existence mode is allowed for the IEEE 802.16m MS.

Table 1 below lists data types classified according to radio access technologies, taken into account for co-located co-existence mode in the IEEE 802.16m system. That is, the data types are classified according to the traffic characteristics of Bluetooth and Wi-Fi that operate in the 2.4 GHz frequency band.

TABLE 1

| Type | Variable |
|---|---|
| Co-existence type 1 | Bluetooth eSCO |
| Co-existence type 2 | Wi-Fi Beacon |
| Co-existence type 3 | Wi-Fi Data/ACK |

When the MS transmits information about a co-existence type along with a co-existence mode request, the BS may allocate a different time sharing pattern according to the co-existence type.

Figure 7:
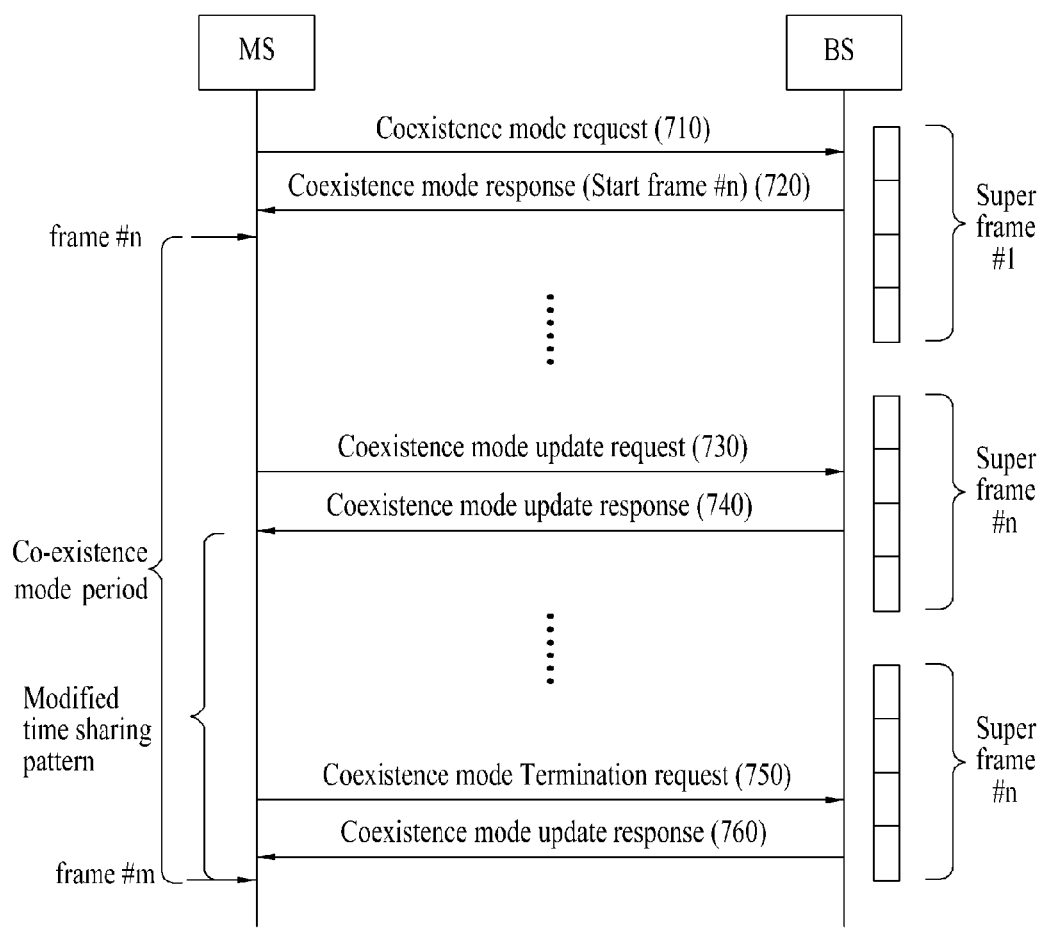
FIG. 7 is a diagram illustrating a signal flow for a procedure of requesting a co-existence mode and receiving a response from a Base Station (BS) in a Mobile Station (MS) having multiple radio interfaces in an IEEE 802.16m system.

FIG. 7 is a diagram illustrating a signal flow for a procedure of requesting a co-existence mode and receiving a response from a BS in an MS having multiple radio interfaces in an IEEE 802.16m system.

Referring to FIG. 7, when the MS determines that it needs to communicate with a Wi-Fi or Bluetooth system during communications with the IEEE 802.16m system, it transmits a co-existence mode request message to the BS in step 710. An IEEE 802.16m Multi-Radio Co-existence Function makes the determination through coordination of a Co-existence Service in an NCMS or by direct communications with a Wi-Fi or Bluetooth Multi-Radio Co-existence Function. The MS transmits information about an intended radio technology (e.g. a co-existence mode type, the number of a preferred start frame, etc.) along with the co-existence mode request.

The BS transmits to the MS a co-existence mode response message with frame allocation information for the co-existence mode (the number of a start frame) according to the received co-existence mode type in step 720. The start frame number allocated by the BS may be identical to the preferred start frame number transmitted by the MS in step 710, or the BS may allocate an arbitrary frame number to the MS.

Upon receipt of the co-existence mode response message, the MS may initiate its operation in the co-existence mode in the indicated frame. During a co-existence mode period, the MS may not communicate with the IEEE 802.16 BS, due to Bluetooth or Wi-Fi communications. In addition, the BS may not allocate resources to MSs near to the MS during the co-existence mode period so that the nearby MSs do not transmit or receive data. This is because the data transmission and reception of the nearby MSs interferes the communications of the MS by other radio technologies.

If too many or too few co-existence mode periods for the amount of data to be transmitted from the MS have been allocated, the MS may transmit a co-existence mode update request message to the BS, requesting change of the co-existence mode periods, change of a co-existence type, or addition of another co-existence type in step 730.

In step 740, the BS may approve the request of the MS or reject it according to an IEEE 802.16m data transmission schedule by a co-existence mode update response message.

If the MS determines that the Wi-Fi or Bluetooth data transmission and reception is not needed any longer during the co-existence mode operation, it transmits a co-existence mode termination request message to the BS in step 750. The BS may then transmit a co-existence mode termination response message instructing the MS to operate in an IEEE 802.16m normal mode to the MS in step 760.

If the MS requests co-existence type 2, this means that the MS intends to receive a Wi-Fi beacon. The MS may receive information with which to select candidate APs for handover or with which to connect to a particular AP by scanning according to the beacon message.

Each AP periodically transmits a beacon every 102.4 ms, but actually with a more or less delay. Since the beacon transmission is periodical but the APs transmit a beacon to the MS, the MS cannot adjust the beacon interval or the transmission time of the beacon. Accordingly, when the MS requests the co-existence mode, it transmits a TBTT value to the BS and the BS allocates a Wi-Fi beacon reception period to the MS at the TBTT. Herein, it is assumed that the IEEE 802.16m BS knows the beacon interval. If the BS does not have knowledge of the beacon interval, the MS notifies the BS of both the beacon interval and the TBTT value.

In the case where different APs have different TBTTs, when the MS requests beacon reception periods to receive beacons from a plurality of APs, the BS cannot avoid non-uniform period allocation. Therefore, allocated beacon reception periods may be indicated by a bitmap indication in an IEEE 802.16m system using a 5:3 DL and UL subframe structure. The bitmap indication may be transmitted in the co-existence mode response message. Considering that all subframes of a 5-ms frame may not be allocated for IEEE 802.16m traffic, the BS should adjust the positions of a Hybrid Automatic Repeat reQuest (HARQ) ACKnowledgment/Negative ACKnowledgment (ACK/NACK) and a MAP.

The BS may repeatedly allocate a co-existence mode period for co-existence type 2 to the MS by BS's polling, unsolicited co-existence mode period allocation, etc.

In the BS's polling scheme, when the MS transmits TBTT information along with a co-existence mode request to the BS, the BS polls the MS before a next TBTT, for example, in a frame previous to a frame in which a beacon is transmitted, to recognize the presence or absence of the MS.

The BS allocates a frequency band to the MS, in which the MS will transmit an uplink message indicating the absence or presence of the MS. The uplink message is, for example, a co-existence mode request message. The BS is aware that the MS is connecting to the BS from the co-existence mode request message received from the MS. The BS transmits period allocation information for beacon reception to the MS by a response message. Also, the message transmitted from the MS may include a changed TBTT, a changed beacon interval or a request for compensating for the time difference between a Wi-Fi or Bluetooth clock and an IEEE 802.16m clock. For instance, if the MS intends to change a beacon interval from an existing value of 102.4 ms to 103 ms due to the difference between clocks used by the MS and the BS, it transmits the changed value in the message.

The BS polls the MS in the frame previous to a TBTT because the BS is not free to communicate with the MS due to communications between the MS and another radio network after the TBTT.

According to the unsolicited co-existence mode period allocation scheme, the BS periodically allocates a co-existence mode period at every TBTT until before the MS requests co-existence mode termination. That is, a type 2 co-existence mode period is allocated without solicitation of the MS. The BS may allocate a co-existence mode period at every TBTT until before the MS transmits a co-existence mode termination request message. If the MS transmits a co-existence mode update request message to change the co-existence mode period or the co-existence type, the unsolicited period allocation may be terminated.

For an MS requesting the co-existence mode to receive a beacon at every TBTT, the BS schedules the MS, considering that communications between the MS and the BS is not available during a co-existence mode period requested by the MS. As the BS does not schedule resources to the MS during a beacon transmission period at each TBTT, it allows the MS to communicate with another wireless network, for example, a Wi-Fi or Bluetooth network.

If the beacon transmission period lasts longer than expected, the BS polls the MS for a time period in which the MS will transmit a beacon reception period change request message, in the first uplink period following the expected beacon transmission period. If a beacon reception period coincides with a transmission period of an allocation indicating message, for example, a Downlink Message Allocation Protocol (DL-MAP) transmission period, the BS allocates uplink resources to the MS by the next DL-MAP, so that the MS may notify whether the duration of the beacon reception period is to be changed. If the next beacon transmission time, i.e. the next TBTT is changed, the MS may request change of the beacon reception period in the transmission opportunity.

Another method for changing the duration of the beacon reception period is for the MS to use a message indicating its presence or absence in the BS's polling scheme. If a previous received beacon is longer than expected, the MS may notify the BS of an expected beacon length, referring to the lengths of a few previous beacons.

Figure 8:
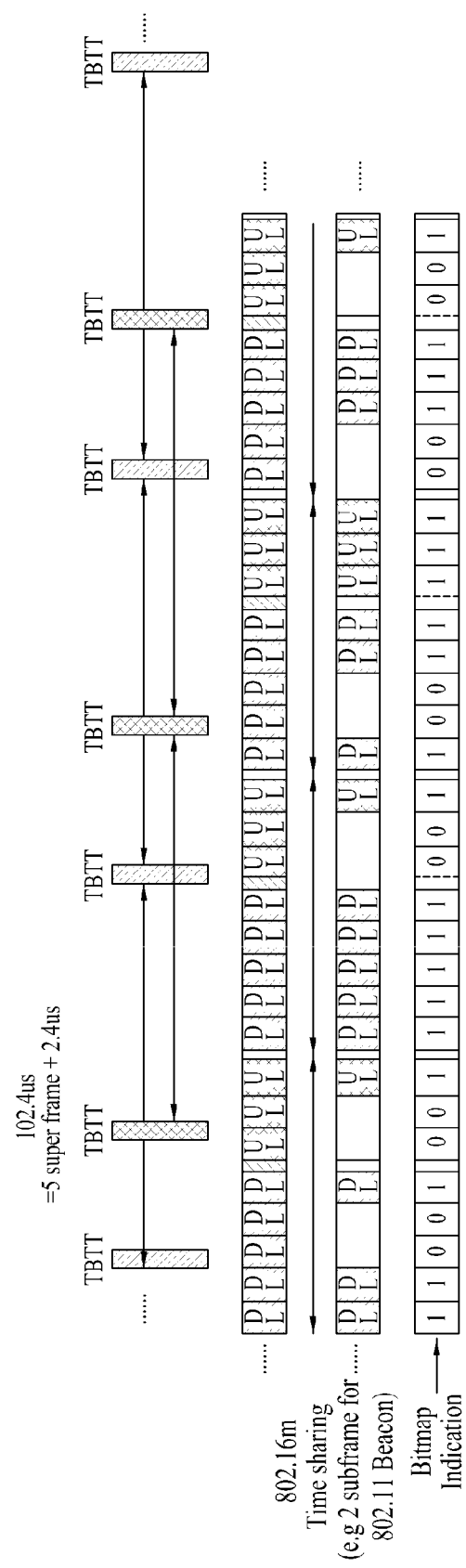
FIG. 8 illustrates an exemplary bitmap for defining a time-sharing pattern applied to an exemplary embodiment of the present invention.

FIG. 8 illustrates an exemplary bitmap for defining a time-sharing pattern applied to an exemplary embodiment of the present invention.

The MS may request period allocation for receiving beacons from a plurality of APs. Since each AP may have a different beacon transmission time, the MS may transmit a plurality of TBTT values to the BS. As illustrated in FIG. 8 periods (i.e., beacon reception periods) for receiving a plurality of beacons may need to be allocated. Because a beacon reception time is variable, the MS may request predetermined values or the BS may determine values, for defining beacon reception periods. FIG. 8 illustrates a bitmap as an exemplary method for indicating beacon reception periods. In the bitmap, subframes allocated as IEEE 802.16m periods are set to 1s and subframes allocated for the co-existence mode are set to 0s. Hence, IEEE 802.16m subframes and subframes for a co-located co-existence radio technology may coexist in the same frame.

Table 2 below illustrates an exemplary format of a co-existence mode response message carrying the above bitmap information.

TABLE 2

| Syntax | Size (bit) | Notes |
|---|---|---|
| CoEX-RSP__Message__format( ) { | | |
| Management Message Type = xx | 8 | |
| Co-existence mode approved | 1 | |
| If (Co-existence mode approved ==1) { | | |
| Co-existence type | | Type 1: Bluetooth<br>Type 2: Wi-Fi Beacon<br>Type 3: Wi-Fi Data/Ack |
| Start frame number | 7 | Co-existence mode start frame number |
| If (Co-existence type ==1) { | | |
| Time sharing pattern | 2 | 0x00: [1] [1] [1] [0] [0] [0] [1] [1]<br>0x01: [1] [1] [0] [0] [0] [0] [1] [1]<br>0x10-0x11: Reserved |
| } | | |
| Co-existence mode bitmap | 8 | Bitmap to indicate if each sub-frame is dedicated to 802.16m system or co-existence mode requested.<br>[0]-[7]: if set to 1, it means [i]th sub-frame is used for IEEE 802.16m time frame Otherwise, used for co-existence mode time frame |
| Period (P) | | Time sharing occurs every P frames |
| } | | |
| } | | |

Figure 9:
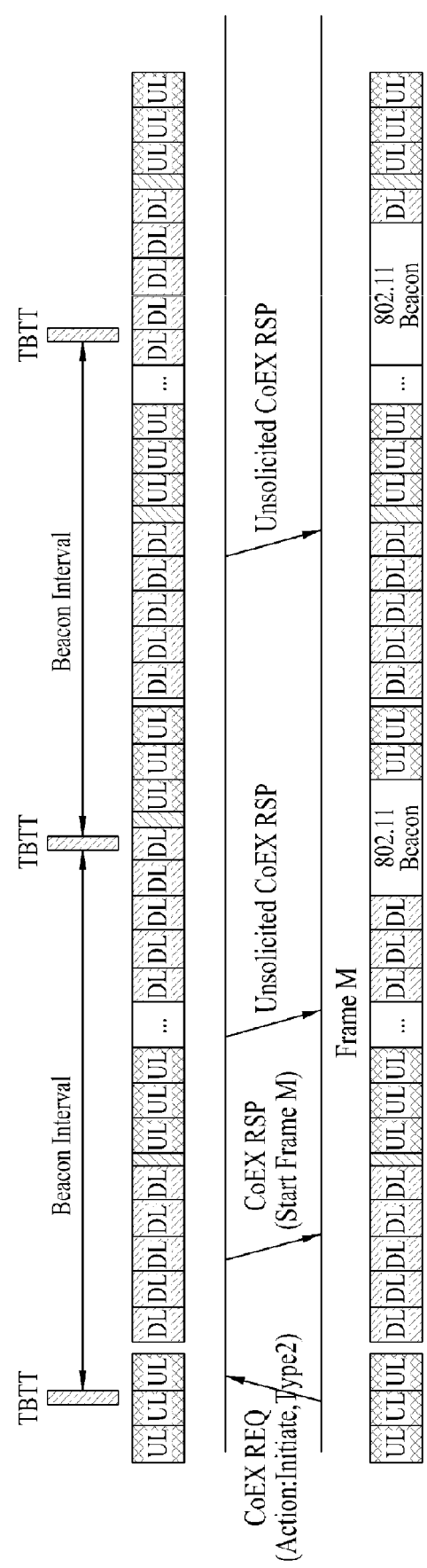
FIG. 9 illustrates allocation of Wi-Fi beacon reception periods at every Target Beacon Transmission Time (TBTT) without request from an MS in a BS according to an exemplary embodiment of the present invention.

FIG. 9 illustrates allocation of Wi-Fi beacon reception periods at every TBTT without request from an MS in a BS according to an exemplary embodiment of the present invention.

Referring to FIG. 9, the MS may add an action code 'Initiate' in a co-existence mode request message, CoEX REQ to operate in the co-existence mode. The BS may transmit a bitmap indicating Wi-Fi communication periods among IEEE 802.16m subframes at every TBTT by an unsolicited co-existence mode response message, unsolicited CoEX RSP.

Figure 10:
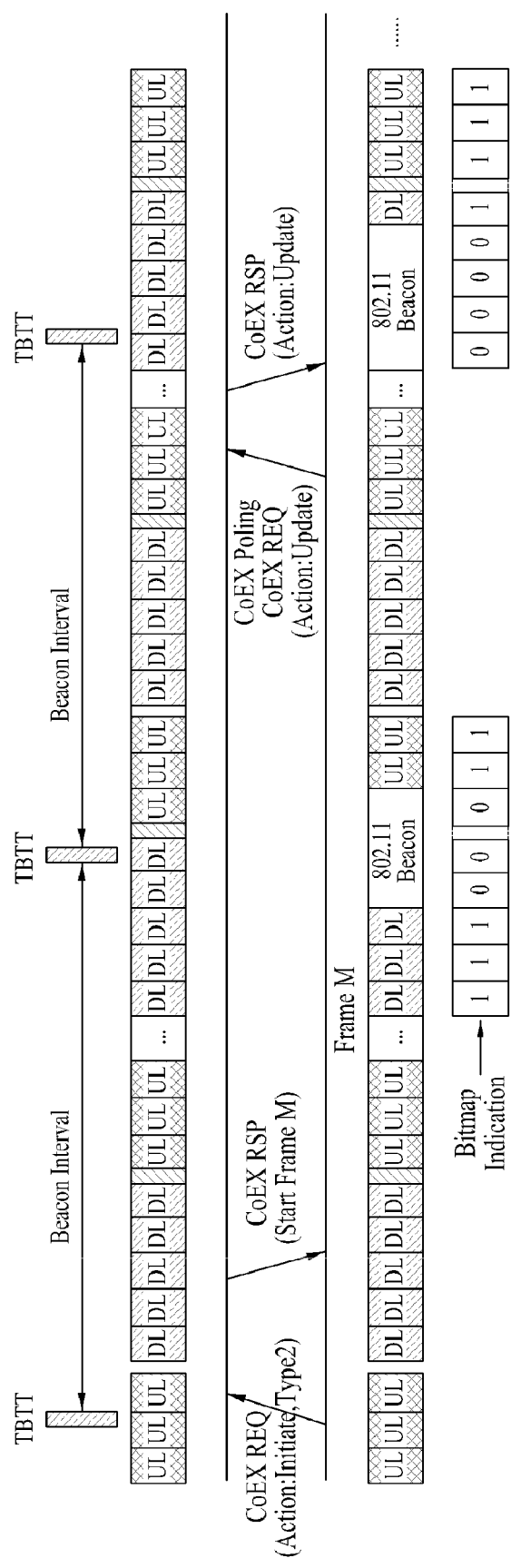
FIG. 10 illustrates requesting allocation of Wi-Fi beacon reception periods at every TBTT in an MS according to another exemplary embodiment of the present invention.

FIG. 10 illustrates requesting allocation of Wi-Fi beacon reception periods at every TBTT in an MS according to another exemplary embodiment of the present invention.

Referring to FIG. 10, for the MS to request period allocation, the BS periodically polls the co-existence-mode MS after allocation of an initial beacon period. If allocated Wi-FI communication periods need to be changed, the MS may transmit a CoEX REQ message including Wi-Fi period change information and an action code set to "update" to the BS. Therefore, the BS may transmit a bitmap indicating changed Wi-Fi communication periods among IEEE 802.16m subframes to the MS by an unsolicited CoEX RSP message.

Now a description will be made of a method for requesting periods for Wi-Fi data/ACK transmission and reception in an IEEE 802.16m MS.

The IEEE 802.16m BS cannot estimate an MS-preferred Wi-Fi data transmission time. Since the time taken to receive an ACK for transmitted data varies with a network situation, it is difficult for the MS to estimate an accurate ACK reception time.

Therefore, for co-existence type 3, the MS requests a transmission opportunity each time it intends to transmit data. For Wi-Fi data transmission, the MS may add an action code 'update' in a CoEX REQ message. The MS may also transmit information about the amount of the data to be transmitted in the CoEX REQ message and be allocated to Wi-Fi data periods under determination of the BS. A CoEX RSP message transmitted from the BS may also have an action code 'update'.

An initially allocated Wi-Fi transmission period may be repeated every predetermined time. If the MS does not complete data transmission in the initial Wi-Fi transmission period, it may request the next Wi-Fi transmission period. In the case where the initially allocated Wi-FI transmission period is repeated every predetermined number of frames, the MS should detect a repetition interval in a CoEX RSP message received from the BS. In case where the MS requests the next Wi-Fi transmission period, the BS may support co-existence polling by a UL-MAP, for the MS.

On the other hand, if the MS completes data transmission in the allocated Wi-Fi transmission period, it may transmit a co-existence mode termination request message for the remainder of a frame used for the Wi-Fi transmission, and thus the BS may allocate the remaining frame for IEEE 802.16m communications. In this case, the BS may determine the reception of the co-existence mode termination request message as release of period allocation for co-existence type 3 which is supposed to be periodical. Also, if the BS has allocated too many or too few type 3 periods for data transmission, the MS may adjust the period allocation by transmitting an update request message to the BS. The IEEE 802.16m BS may adjust the period arbitrarily according to a network situation.

Figure 11:
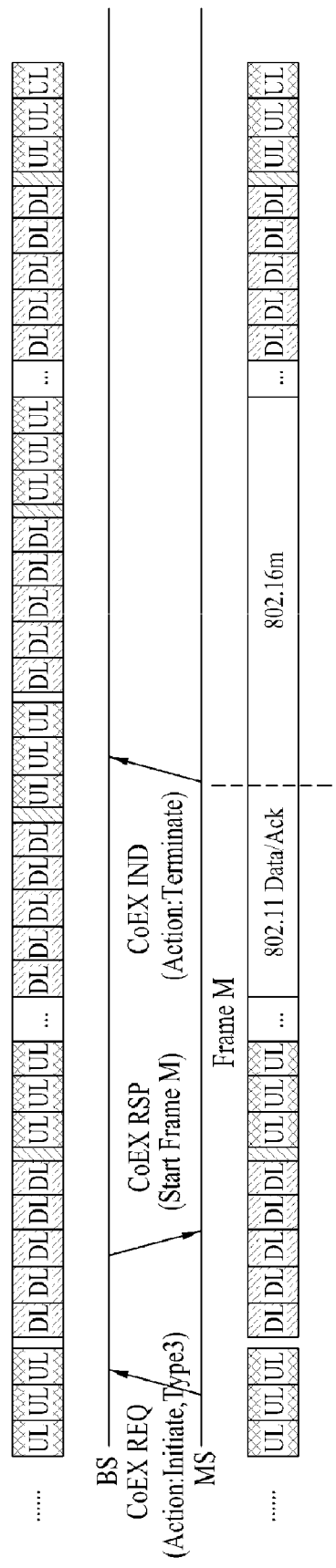
FIG. 11 illustrates transmission of a co-existence mode indication message for co-existence mode termination from an MS so that the MS may operate in an IEEE 802.16m-only mode in a remaining period, when the MS completes transmission of Wi-Fi data early according to an exemplary embodiment of the present invention.

FIG. 11 illustrates transmission of a co-existence mode indication message, CoEX IND for co-existence mode termination from an MS so that the MS may operate in an IEEE 802.16m-only mode in a remaining period, when the MS completes transmission of Wi-Fi data early according to an exemplary embodiment of the present invention.

The scenario illustrated in FIG. 11 is expected because the MS may not estimate the time taken to receive an ACK message after it transmits data. To terminate a Wi-Fi operation, the MS may include an action code 'terminate' indicating termination in a co-existence indication message, CoEX IND or add the action code 'terminate' to a CoEX REQ message. It is preferable that the BS allocates as short an initial period as possible for the Wi-Fi co-existence mode.

Figure 12:
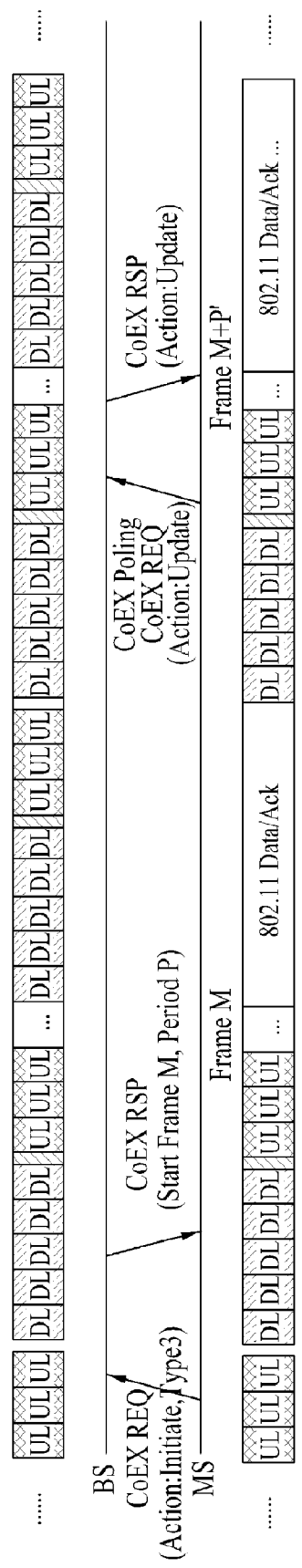
FIG. 12 illustrates periodic allocation of WI-Fi data transmission periods according to an exemplary embodiment of the present invention.

FIG. 12 illustrates periodic allocation of WI-Fi data transmission periods according to an exemplary embodiment of the present invention.

Referring to FIG. 12, the BS allocates a time period of a predetermined duration for co-existence type 3 at every predetermined interval P. If the MS determines that WI-Fi data transmission is urgent or an allocated period is short, it may request change of the allocation interval or the duration of the allocated period. The MS may add an action code 'update' in a CoEX REQ message to change the allocation interval or the duration of the allocated period. The CoEX REQ message may be transmitted through uplink resources allocated from the BS through co-existence polling.

As is apparent from the above description of the exemplary embodiments of the present invention, a frame allocation pattern for allocating periods for communications with a Bluetooth or Wi-Fi system using a frequency band adjacent to that of an IEEE 802.16m system can be provided according to an IEEE 802.16m frame structure, and an MS with multiple radio interfaces can communicate with each system reliably, while minimizing interference between systems.

The exemplary embodiments of the present invention, in which when an MS with multiple radio interfaces attempt to communicate with a plurality of wireless systems, the MS may efficiently receive a service from each system with reduced interference between systems during communications, are applicable to a variety of wireless access systems. The wireless access systems may include a $3^{rd}$ Generation Partnership Project (3GPP) system, a 3GPP2 and/or IEEE 802.xx system, etc. for example. Besides these wireless access systems, the exemplary embodiments of the present invention are applicable to all technical applications of the wireless access systems.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an exemplary embodiment of the present invention or included as a new claim by a subsequent amendment after the application is filed.

What is claimed is:

1. A method for allocating multiple radio communication periods to a Mobile Station (MS) supporting co-existence mode, the method comprising:
    transmitting a co-existence mode request message to a Base Station (BS) by the MS;
    receiving information about the position of a start frame for the co-existence mode through a co-existence mode response message as a response to the co-existence mode request message from the BS by the MS; and
    receiving information about an allocated Wireless Fidelity (Wi-Fi) beacon reception period through an unsolicited co-existence mode response message in the start frame from the BS by the MS.

2. The method according to claim 1, wherein the co-existence mode request message includes a Target Beacon Transmission Time (TBTT) for the MS.

3. The method according to claim 2, wherein the information about an allocated Wi-Fi beacon reception period is information calculated using the TBTT by the BS.

4. The method according to claim 1, wherein the information about an allocated Wi-Fi beacon reception period includes a bitmap indicating positions of subframes in which the MS will receive a Wi-FI beacon.

5. A method for allocating multiple radio communication periods to a Mobile Station (MS) supporting co-existence mode, the method comprising:
    transmitting a co-existence mode request message to a Base Station (BS) by the MS;
    receiving information about the position of a start frame for the co-existence mode through a co-existence mode response message as a response to the co-existence mode request message from the BS by the MS;
    requesting allocation of a Wireless Fidelity (Wi-Fi) beacon reception period to the BS through co-existence polling by the MS; and
    receiving information about an allocated Wi-Fi beacon reception period through an unsolicited co-existence mode response message as a response to the co-existence polling from the BS by the MS.

6. The method according to claim 5, wherein the co-existence mode request message includes a Target Beacon Transmission Time (TBTT) for the MS.

7. A method for allocating multiple radio communication periods to a Mobile Station (MS) supporting co-existence mode, the method comprising:
    transmitting a co-existence mode request message to a Base Station (BS) by the MS;
    receiving information about the position of a start frame for the co-existence mode through a co-existence mode response message as a response to the co-existence mode request message from the BS by the MS;
    requesting allocation of a Wireless Fidelity (Wi-Fi) data period to the BS through co-existence polling by the MS; and
    receiving information about an allocated Wi-Fi data period through an unsolicited co-existence mode response message as a response for the co-existence polling from the BS by the MS.

8. The method according to claim 7, wherein the requesting of allocation of a Wi-Fi data period comprises requesting change of an allocated Wi-Fi data period.

9. The method according to claim 7, further comprising transmitting a co-existence mode termination message to the BS by the MS, if the MS completes data transmission and reception in the allocated Wi-Fi data period.

10. The method according to claim 7, wherein the information about an allocated Wi-Fi data period includes a bitmap indicating positions of subframes in which the MS will receive Wi-Fi data.

11. The method according to claim 7, wherein the allocated WI-Fi data period includes a time period in which the MS will receive an ACKnowledgment (ACK) message for data transmitted by the MS.

* * * * *